United States Patent
Chang et al.

(10) Patent No.: US 8,704,457 B2
(45) Date of Patent: Apr. 22, 2014

(54) POWER CONVERSION CIRCUIT FOR LIGHT EMITTING DIODE

(75) Inventors: Wen-Ti Chang, Hsin-Chu (TW);
Yuan-Pin Cho, Hsin-Chu (TW);
Chin-Chuang Chueh, Hsin-Chu (TW);
Chia-Yuan Chang, Hsin-Chu (TW)

(73) Assignee: Au Optronics Corp., Hsinchu (TW)

( * ) Notice: Subject to any disclaimer, the term of this patent is extended or adjusted under 35 U.S.C. 154(b) by 410 days.

(21) Appl. No.: 13/163,873

(22) Filed: Jun. 20, 2011

(65) Prior Publication Data

US 2012/0119675 A1    May 17, 2012

(30) Foreign Application Priority Data

Nov. 12, 2010    (TW) .............................. 99138953 A

(51) Int. Cl.
*H05B 37/02*    (2006.01)

(52) U.S. Cl.
USPC .......................................... 315/294; 315/307

(58) Field of Classification Search
USPC .......... 315/185 R, 209 R, 224, 225, 276, 291, 315/307, 308, 294
See application file for complete search history.

(56) References Cited

U.S. PATENT DOCUMENTS

| | | | |
|---|---|---|---|
| 6,563,275 B2 * | 5/2003 | Ito et al. ......................... | 315/308 |
| 6,864,641 B2 | 3/2005 | Dygert | |
| 7,256,554 B2 * | 8/2007 | Lys ............................... | 315/291 |
| 7,579,786 B2 | 8/2009 | Soos | |
| 7,598,685 B1 | 10/2009 | Shteynberg et al. | |
| 2004/0032754 A1 | 2/2004 | Yang | |
| 2007/0080911 A1 | 4/2007 | Liu et al. | |
| 2011/0074839 A1 | 3/2011 | Liu et al. | |

FOREIGN PATENT DOCUMENTS

| | | |
|---|---|---|
| CN | 1100848 | 3/1995 |
| CN | 101321422 | 12/2008 |
| EP | 2079284 A2 | 7/2009 |
| TW | 200715237 A | 5/2008 |

OTHER PUBLICATIONS

Taiwan Patent Office, Office Action, Nov. 26, 2013.

* cited by examiner

*Primary Examiner* — Jimmy Vu
(74) *Attorney, Agent, or Firm* — WPAT, PC; Justin King

(57) ABSTRACT

A power conversion circuit for light emitting diode includes a voltage converter. The voltage converter has two receiving terminals and two output terminals. The two receiving terminals of the voltage converter are electrically coupled to the direct current power supply, and the output terminals output corresponding direct current signals according to the received direct current power supply, to drive a light emitting diode string. One of the output terminals has a positive potential, and another output terminal has a negative potential.

5 Claims, 3 Drawing Sheets

POWER CONVERSION CIRCUIT FOR LIGHT EMITTING DIODE

FIELD OF THE INVENTION

The present invention relates to power conversion circuits for light emitting diode, and more particularly to a power conversion circuit for light emitting diode, having one output terminal with a positive potential and another output terminal with a negative potential.

BACKGROUND OF THE INVENTION

Light-emitting diodes (LEDs) are new generation of lighting elements, which has advantages of power-saving and long life etc., so they have been widely used in various devices, especially used in backlight modules of flat panel displays, such as liquid crystal displays.

Light emitting diode strings of flat panel displays have to be driven via driving circuits to make the light emitting diodes to emit light. But each light emitting diode has its own load characteristics of voltage-current curve; therefore, different electrical currents would be produced to flow through the light emitting diodes even though the light emitting diodes are driven by a same driving voltage. When electrical currents through different light emitting diodes are different, the light emitting diodes would have different brightness. So, a number of light emitting diodes are electrically coupled to each other in series to ensure that a same electrical current flows through the light emitting diodes to make the light emitting diodes with a same brightness.

The more the light emitting diodes electrically coupled in the light emitting diode string, the greater the DC voltage to drive the light emitting diode string is. Unfortunately, components in the driving circuit can only withstand a certain voltage value. For a larger display panel, since the amount of the light emitting diodes in each light emitting diode string is limited, so plural light-emitting diode strings are used to achieve the lighting purpose. Correspondingly, more steady flow circuits and control circuits must be used in the lager display panel, or high-voltage electronic components can be used to form the driving circuit in the larger display panel. However, cost is inevitably increased in both of the approaches, and even some of the associated solutions would make control circuits more complex for achieving illumination uniformity.

SUMMARY OF THE INVENTION

Therefore, the present invention is to provide a power conversion circuit for light emitting diode which is adapted to drive a light emitting diode string. The power conversion circuit comprises a voltage converter. The voltage converter has two receiving terminals and two output terminals. The two receiving terminals are electrically coupled to a direct current power supply to convert the direct current power supply to direct current output signals which are outputted from the output terminals of the voltage converter to drive the light emitting diode string. One of the output terminals has a positive potential and another one of the output terminals has a negative potential.

In one embodiment, the voltage converter comprises a first receiving terminal, a second receiving terminal, a first output terminal, a second output terminal, a switch, a first inductor, a second inductor, a third inductor, a first unilateral connecting component, a second unilateral connecting component, a first capacitor and a second capacitor. The first receiving terminal is electrically coupled to an end of the direct current power supply to receive a high potential. The second receiving terminal is electrically coupled to another end of the direct current power supply to receive a low potential. The first output terminal is electrically coupled to an end of the light emitting diode string to provide an output of positive potential. The second output terminal is electrically coupled to another end of the light emitting diode string to provide an output of negative potential. The switch has a first terminal and a second terminal. The first terminal of the switch is electrically coupled to the first receiving terminal to receive the high potential. The first inductor has a positive terminal and a negative terminal. The positive terminal of the first inductor is electrically coupled to the second terminal of the switch, and the negative terminal of the first inductor is electrically coupled to the second receiving terminal to receive the low potential. The second inductor has a positive terminal and a negative terminal. The second inductor is electromagnetically coupled to the first inductor, and the negative terminal of the second inductor is maintained at a preset low potential. The third inductor has a positive terminal and a negative terminal. The third inductor is electromagnetically coupled to the first inductor, and the negative terminal of the third inductor is electrically coupled to the second output terminal. The first unilateral connecting component is electrically coupled to the positive terminal of the second inductor and the first output terminal, and only allows electrical current to flow from the positive terminal of the second inductor to the first output terminal. The second unilateral connecting component is electrically coupled to the positive terminal of the third inductor and the negative terminal of the second inductor, and only allows electrical current to flow from the positive terminal of the third inductor to the negative terminal of the second inductor. One end of the first capacitor is electrically coupled to the first output terminal, and another end of the first capacitor is electrically coupled to the negative terminal of the second inductor. One end of the second capacitor is electrically coupled to the negative terminal of the second inductor, and another end of the second capacitor is electrically coupled to the second output terminal. Additionally, the preset potential can be the ground potential.

In one embodiment, the voltage converter comprises a first receiving terminal, a second receiving terminal, a first output terminal, a second output terminal, a potential booster, and an inverse potential booster. The first receiving terminal is electrically coupled to an end of the direct current power supply to receive a high potential. The second receiving terminal is electrically coupled to another end of the direct current power supply to receive a low potential. The first output terminal is electrically coupled to an end of the light emitting diode string to provide an output of positive potential. The second output terminal is electrically coupled to another end of the light emitting diode string to provide an output of negative potential. The potential booster is electrically coupled to the first receiving terminal and the second receiving terminal to receive the direct current power supply, and has its output terminal served as the first output terminal. The inverse potential booster is electrically coupled to the first receiving terminal and the second receiving terminal to receive the direct current power supply, and has its output terminal served as the second output terminal.

In this embodiment, the potential booster comprises an inductor, a switch, a unilateral connecting component and a capacitor. THE inductor has a first terminal and a second terminal. The first terminal of the inductor is electrically coupled to the first receiving terminal. The switch is electrically coupled to the second terminal of the inductor and the second receiving terminal. The unilateral connecting component is electrically coupled to the second terminal of the inductor and the first output terminal, and only allows electrical current to flow from the second terminal of the inductor to the first output terminal. The capacitor is electrically coupled to the first output terminal and the second receiving terminal.

In this embodiment, the inverse potential booster comprises a switch, an inductor, a unilateral connecting component and a capacitor. The switch has a first terminal and a second terminal. The first terminal is electrically coupled to the first receiving terminal. The inductor is electrically coupled to the second terminal of the switch and the second receiving terminal. The unilateral connecting component is electrically coupled to the second terminal of the switch and the second output terminal, and only allows electrical current to flow from the second output terminal to the inductor. The capacitor is electrically coupled to the second output terminal and the second receiving terminal.

The power conversion circuit of the present invention makes the potentials outputted from the two output terminals of the voltage converter to be at both sides of the ground potential. Therefore, the internal components of the power conversion circuit would not be in a high-voltage state; the components with the same quality applied in the power conversion circuit of the embodiments can withstand a larger cross-voltage than those applied in conventional power conversion circuits. The light emitting diode strings can accommodate a larger amount of light emitting diodes. Accordingly, the power conversion circuit of the present invention can reduce manufacturing cost, and resolve the problems of inequality brightness and complex control of the light emitting diode string.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
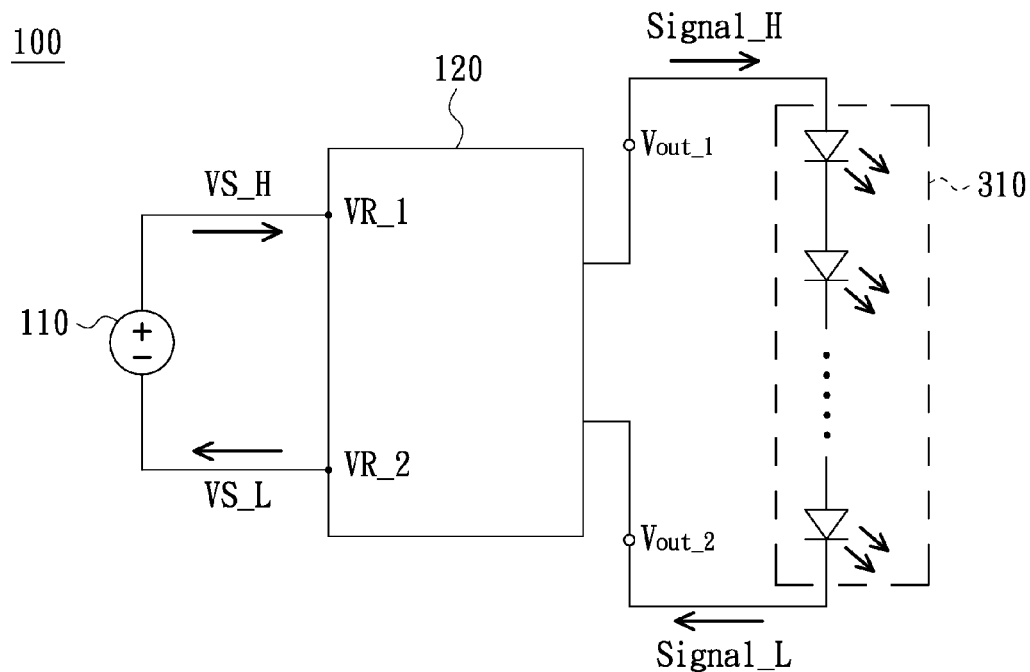
FIG. 1 is a block diagram of a part of a power conversion circuit according to an embodiment of the present invention.

A power conversion circuit for light emitting diodes is thereby developed to improve the lack of the conventional means and is illustrated as below. FIG. 1 is a block diagram of a part of a power conversion circuit according to an embodiment of the present invention. The power conversion circuit as shown in FIG. 1 is suitable for a backlight module of a flat panel display, such as a liquid crystal display, to drive a light emitting diode string of the flat panel display, but the invention is not limited to this embodiment. The power conversion circuit, for example, can also be used for light emitting diodes of residential lighting lamps and traffic lights for special lighting purpose. As shown in FIG. 1, the power conversion circuit 100 includes a direct current (DC) power supply 110, a voltage converter 120 and a light emitting diode string 310. The voltage converter 120 has two receiving terminals and two output terminals. The first receiving terminal $VR\_1$ is electrically coupled to an output terminal of the DC power supply 110 which outputs a corresponding high potential $VS\_H$, and the second receiving terminal $VR\_2$ is electrically coupled to an output terminal of the DC power supply 110 which outputs a corresponding low potential $VS\_L$. The first output terminal $Vout\_1$ is electrically coupled to a high potential terminal of the light emitting diode string 310 and outputs a first output DC signal $Signal\_H$ according to the high potential $VS\_H$. The second output terminal $Vout\_2$ is electrically coupled to a low potential terminal of the light emitting diode string 310 and outputs a second DC output signal $Signal\_L$ according to the low potential $VS\_L$.

Figure 2:
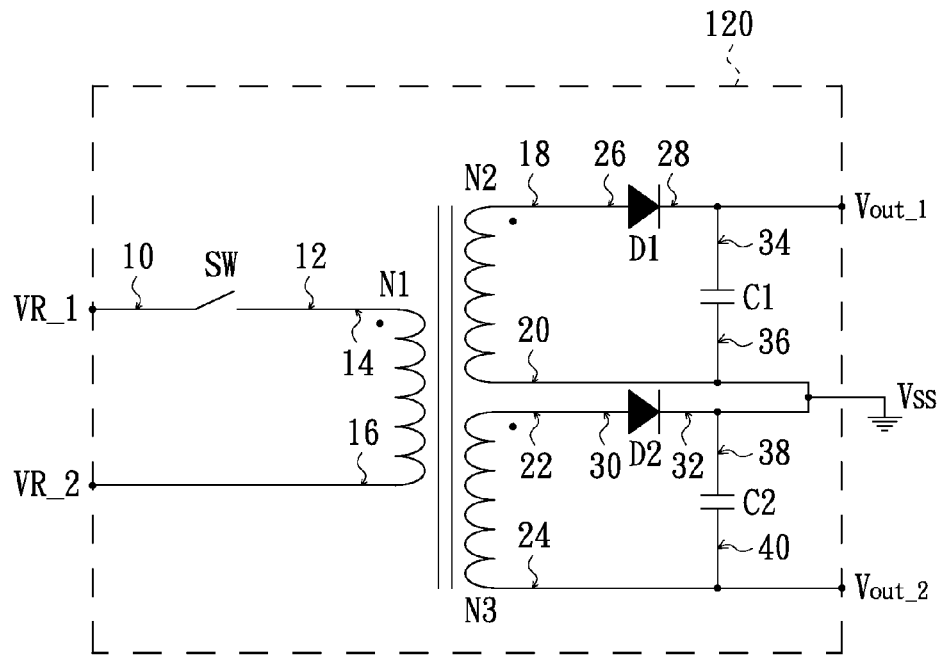
FIG. 2 is a circuit diagram of a voltage converter of FIG. 1.

FIG. 2 is a circuit diagram of the voltage converter of FIG. 1. The voltage converter 120 is illustrated in detail below, combining with FIG. 1 and FIG. 2. Specifically, the voltage converter 120 includes the first receiving terminal $VR\_1$, the second receiving terminal $VR\_2$, the first output terminal $Vout\_1$, the second output terminal $Vout\_2$, a switch SW, inductors N1, N2 and N3, unilateral connecting component D1 and D2, and capacitors C1, C2. The switch SW has a first terminal 10 and a second terminal 12. The first terminal 10 is electrically coupled to the first receiving terminal $VR\_1$ to receive the high potential $VS\_H$. The inductor N1 (also called first inductor hereafter) has a positive terminal 14 and a negative terminal 16. The positive terminal 14 is electrically coupled to the second terminal 12 of the switch SW, and the negative terminal 16 is electrically coupled to the second receiving terminal $VR\_2$ to receive the low potential $VS\_L$. The inductor N2 (also called second inductor hereafter) has a positive terminal 18 and a negative terminal 20. The inductors N1, N2 are electromagnetically coupled to each other, and the negative terminal 20 of the inductor N2 is maintained at a preset potential Vss. The inductor N3 (also called third inductor hereafter) has a positive terminal 22 and a negative terminal 24. The inductors N1 and N3 are electromagnetically coupled to each other, and the negative terminal 24 of the inductor N3 is electrically coupled to the second output terminal $Vout\_2$ to provide the negative potential $Signal\_L$ (also called second DC output signal hereafter). The unilateral connecting component D1 has a positive terminal 26 and a negative terminal 28. The positive terminal 26 is electrically coupled to the positive terminal 18 of the inductor N2, and the negative terminal 28 is electrically coupled to the first output terminal $Vout\_1$ to provide a positive potential $Signal\_H$ (also called first DC output signal hereafter). The unilateral connecting component D1 only allows electrical current to flow from the positive terminal 18 of the inductor N2 to the output terminal $Vout\_1$. The unilateral connecting component D2 has a positive terminal 30 and a negative terminal 32. The positive terminal 30 is electrically coupled to the positive terminal 22 of the inductor N3, and the negative terminal 32 is electrically coupled to the negative terminal 20 of the inductor N2 and maintained at the preset potential Vss. The unilateral connecting component D2 only allows electrical current to flow from the positive terminal 22 of the inductor N3 to the negative terminal 20 of the inductor N2. The capacitor C1 has a first channel terminal 34 and a second channel terminal 36. The first channel terminal 34 is electrically coupled to the first output terminal $Vout\_1$, and the second channel terminal 36 is electrically coupled to the negative terminal 20 of the inductor N2. The capacitor C2 has a first channel terminal 38 and a second channel terminal 40. The first channel terminal 38 is electrically coupled to the negative terminal 20 of the inductor N2 and the preset potential Vss, and the second channel terminal 40 is electrically coupled to the second output terminal Vout_2.

Additionally, the above-mentioned preset potential Vss can be any potential, but the preset potential Vss is preferably the ground potential in order to maintain the minimum pressure.

The switch SW used in the voltage converter 120 can be replaced by other components, such as transistors. Please refer to both FIG. 1 and FIG. 2, when the switch SW is conducted, the first output terminal Vout_1 and the second output terminal Vout_2 are powered by the DC power supply 110 through respectively electromagnetic coupling of the inductor N2 and the inductor N3 with the inductor N1. The first receiving terminal VR_1 receives the high-potential VS_H from the DC power supply 110, and the second receiving terminal VR_2 receives the low potential VS_L from the DC power supply 110, and an electrical current flowing from the first receiving terminal VR_1 to the second receiving terminal VR_2 is generated. At this time, the positive terminal 14 of the inductor N1 is pulled up to the high potential VS_H and the negative terminal 16 of the inductor N1 is at the low potential VS_L; thus, the DC power supply 110, the switch SW and the inductor N1 form an electrical conduction path.

When the inductor N2 provides energy supply, the unilateral connecting component D1 is conducted. At this time, the inductor N2 and the inductor N1 are electromagnetically coupled, and a positive high voltage is generated at the positive terminal 18 of the inductor N2, according to the turn ratio of the inductor N1 and the inductor N2. The negative inductor terminal 20 of the inductor N2 is maintained at the preset potential Vss. Therefore, the positive terminal 26 of the unilateral connecting component D1 is at a positive potential to make the unilateral connecting component D1 to be conducted, and the unilateral connecting component D1 only allows the electrical current to flow from the positive terminal 18 of the inductor N2 to the first output terminal Vout_1, and thus the first output terminal Vout_1 is maintained at a positive potential, i.e., the first DC output signal Signal_H. Accordingly, the first channel terminal 34 of the capacitor C1 is at a positive potential, and the second channel terminal 36 of the capacitor C1 is maintained at the preset potential Vss (ground potential here is.)

When the inductor N3 provides energy supply, the unilateral connecting component D2 is conducted. At this time, the inductor N3 and the inductor N1 are electromagnetically coupled, and a high potential difference is generated between the output terminals of the inductor N3 according to the turn ratio of the inductor N3 and the inductor N1. When the potential of the positive terminal 22 of the inductor N3 is equal to or higher than the preset potential Vss, the unilateral connecting component D2 is thus conducted, to allow the electrical current to pass through the unilateral connecting component D2 and flow from the positive terminal 22 of the inductor N3 to the negative terminal 20 of the inductor N2. Because the value of the preset potential is fixed, the potential of the positive terminal 22 of the inductor N3 is therefore clamped to the potential capable of making the unilateral connecting component D2 to be conducted. For example, for a common unilateral connecting component, i.e., diode, since the necessary potential difference for conducting the diode is 0.7 Volts, the potential of the positive terminal 22 of the inductor N3 is therefore clamped to a potential which is 0.7 Volts higher than the preset potential Vss. Furthermore, the negative terminal 24 of the inductor N3 is electrically coupled to the second output terminal Vout_2. Since a potential difference exists between the two terminals of the inductor N3 and the positive terminal 22 of the inductor N3 is clamped to the potential which is 0.7 Volts higher than the preset potential Vss, the negative terminal 24 of the inductor N3 can be maintained at a negative potential so long as the preset potential Vss has an appropriate value. Accordingly, the first channel terminal 38 of the capacitor C2 is maintained at the preset potential Vss, and the second channel terminal 40 of the capacitor C2 is electrically coupled to the second output terminal Vout_2 and is maintained at a negative potential.

On the other hand, when the switch SW is closed, the potentials outputted from the inductors N2, N3 can be reversed. At this time, the power supply is provided by the capacitors C1, C2 to thus maintain a stable power output.

Either the inductors or the capacitors provide the power supply required by the light emitting diode string, it is assumed that the total cross-voltage between the first output terminal Vout_1 and the second output terminal Vout_2 at this time must be maintained at +HV, the potential between the first output terminal Vout_1 and the preset potential Vss (ground potential here is) is +HV', and thus the potential between the preset potential Vss (ground potential here is) and the second output terminal Vout_2 is maintained at +(HV−HV'). Therefore, by using the two coupled inductors, the cross-potential in each coupling circuit is only less than HV, therefore, the voltage the circuit must withstand is decreased and the driving voltage +HV provided to the light emitting diode string can be stabilized.

Figure 3:
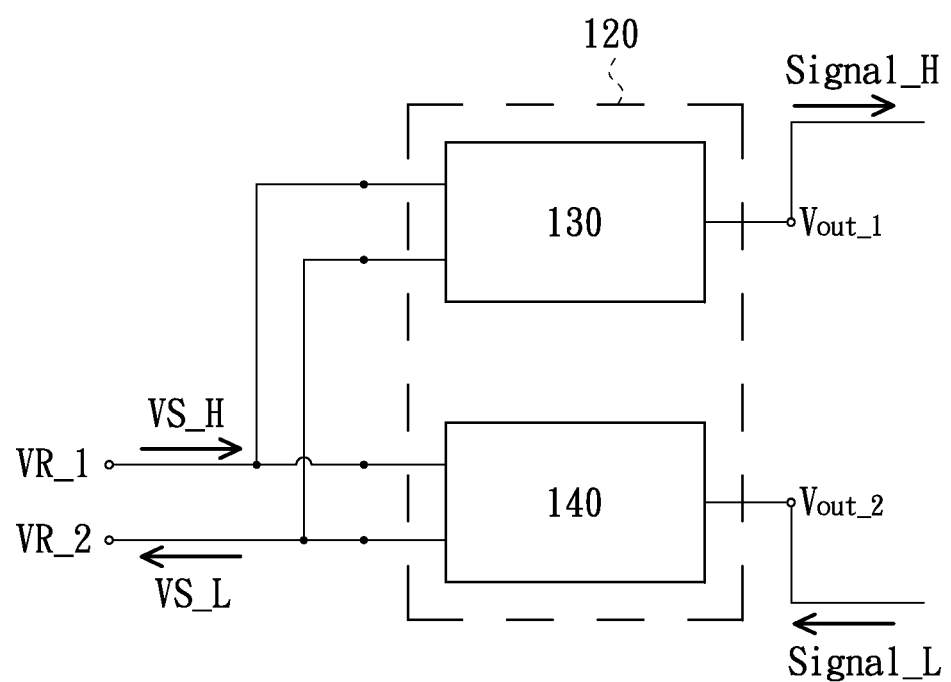
FIG. 3 is a circuit block of a voltage converter according to another embodiment of the present invention.

FIG. 3 is a circuit block of a voltage converter according to another embodiment of the present invention. The embodiment shown in FIG. 3 is similar to the embodiment shown in FIG. 2, the difference is that the coupled inductors are used to drive the light emitting diode string in the embodiment shown in FIG. 2, but a potential booster 130 and an inverse potential booster 140 are used to drive the light emitting diode string in the embodiment shown in FIG. 3. In other words, two sets of coupled inductors are used in the embodiment shown in FIG. 2 to respectively provide the voltages +HV' and +(HV−HV') to thereby supply the total cross-voltage +HV to the light emitting diode string. Similarly, the potential booster 130 and the inverse potential booster 140 in the embodiment shown in FIG. 3 respectively provide the voltages +HV' and +(HV− HV') to thereby supply the total cross-voltage +HV to the light emitting diode string.

Also referring to FIG. 3, in this embodiment, the voltage converter 120 includes a first receiving terminal VR_1, a second receiving terminal VR_2, a first output terminal Vout_1, a second output terminal Vout_2, the potential booster 130 and the reverse potential booster 140. The potential booster 130 has two input terminals and an output terminal. One of the input terminal of the potential booster 130 is electrically coupled to the first receiving terminal VR_1 to receive a high potential VS_H, the other input terminal of the potential booster 130 is electrically coupled to the second receiving terminal VR_2 to receive a low potential VS_L, and the output terminal of the potential booster 130 is served as the first output terminal Vout_1 to provide a positive potential Signal_H (also called first DC output signal hereafter). The reverse potential booster 140 also has two input terminals and an output terminal. One of the input terminal of the inverse potential booster 140 is electrically coupled to the first receiving terminal VR_1 to receive the high potential VS_H, another input terminal of the inverse potential booster 140 is electrically coupled to the second receiving terminal VR_2 to receive the low potential VS_L, and the output terminal of the reverse potential booster 140 is served as the second output terminal Vout_2 to provide a negative potential Signal_L (also called second DC output signal hereafter).

Figure 4A:
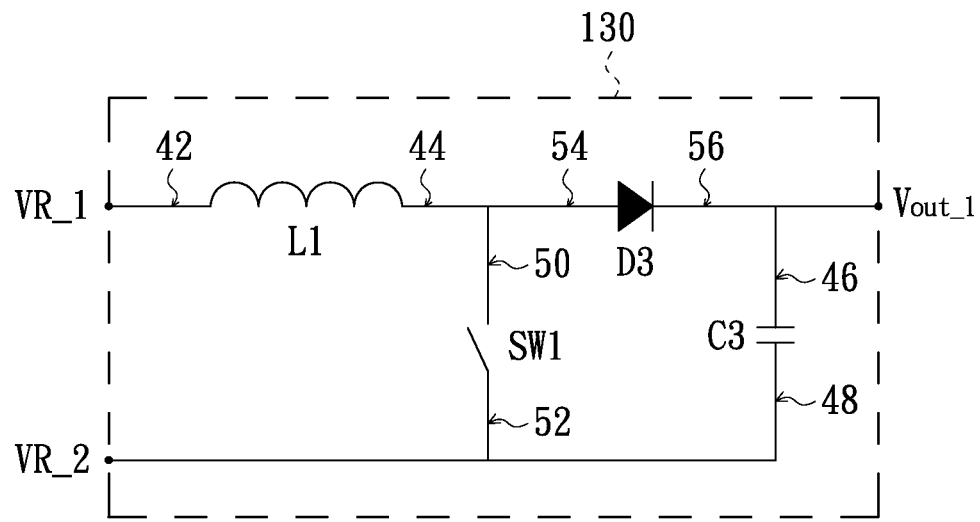
FIG. 4(A) is a circuit diagram of a potential booster of the voltage converter of FIG. 3.

Specifically, referring to FIG. 4(A), the potential booster 130 of this embodiment includes an inductor L1, a switch SW1, a unilateral connecting component D3 and a capacitor C3. The inductor L1 has a first terminal 42 and a second terminal 44. The first terminal 42 of the inductor L1 is electrically coupled to the first receiving terminal VR_1 to receive the high potential VS_H. The switch SW1 has a first terminal 50 and a second terminal 52. The first terminal 50 of the switch SW1 is electrically coupled to the second terminal 44 of the inductor L1, the second terminal 52 of the switch SW1 is electrically coupled to the second receiving terminal VR_2. The unilateral connecting component D3 has a positive terminal 54 and a negative terminal 56. The positive terminal 54 of the unilateral connecting component D3 is electrically coupled to the second terminal 44 of the inductor L1; and the negative terminal 56 of the unilateral connecting component D3 is electrically coupled to the first output terminal Vout_1 to provide the positive potential Signal_H (also called first DC output signal hereafter). The unilateral connecting component D3 only allows the electrical current to flow from the second terminal 44 of the inductor L1 to the first output terminal Vout_1. The capacitor C3 has a first channel terminal 46 and a second channel terminal 48. The first channel terminal 46 is electrically coupled to the first output terminal Vout_1, the second channel terminal 48 is electrically coupled to the second receiving terminal VR_2 to receive the low potential VS_L.

Figure 4B:
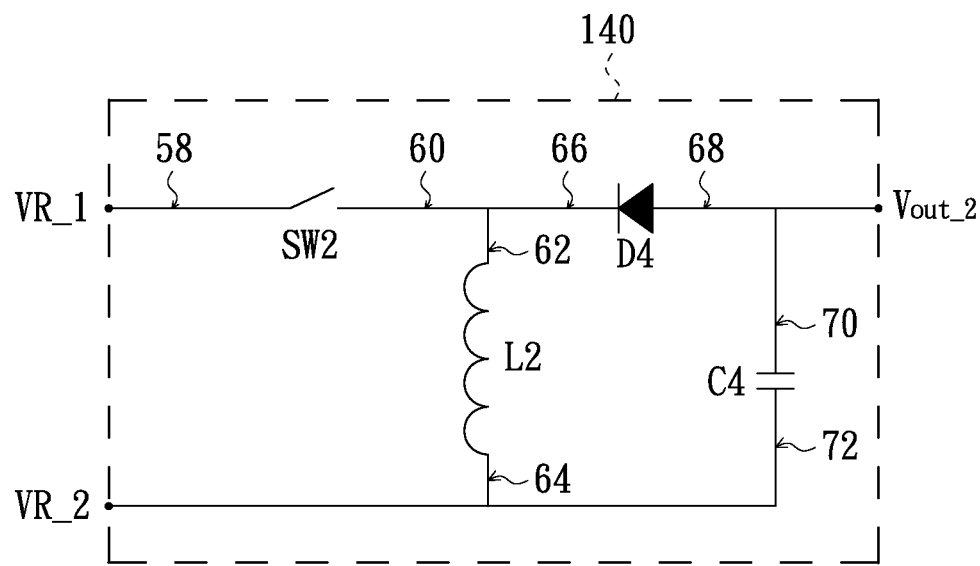
FIG. 4(B) is a circuit diagram of an inverse potential booster of the voltage converter of FIG. 3.

Furthermore, referring to FIG. 4(B), the reverse potential booster 140 of this embodiment includes a switch SW2, an inductor L2, D4, and a unilateral connecting component D4 and a capacitor C4. The switch SW2 has a first terminal 58 and a second terminal 60. The first terminal 58 is electrically coupled to the first receiving terminal VR_1. The inductor L2 has a first terminal 62 and a second terminal 64. The first terminal 62 is electrically coupled to the second terminal 60 of the switch SW2; the second terminal 64 is electrically coupled to the second receiving terminal VR_2 to receive the low potential VS_L. The unilateral connecting component D4 has a negative terminal 66 and a positive terminal 68. The negative terminal 66 is electrically coupled to the second terminal 60 of the switch SW2; the positive terminal 68 is electrically coupled to the second output terminal Vout_2 to provide the negative potential Siganl_L (also called second DC output signal hereafter). The unilateral connecting component D4 only allows the electrical current to flow from the second output terminal Vout_2 to the first terminal 62 of the inductor L2. The capacitor C4 has a first channel terminal 70 and a second channel terminal 72. The first channel terminal 70 is electrically coupled to the second output terminal Vout_2; the second channel terminal 72 is electrically coupled to the second receiving terminal VR_2 to receive the low potential VS_L.

Operation modes of the potential booster and the inverse potential booster of this embodiment are described as follows. Referring to FIG. 4(A) and FIG. 3, when the switch SW1 is conducted, the first terminal 42 of the inductor L1, electrically coupled to the first receiving terminal VR_1, is pulled up to the high potential VS_H. The second terminal 44 of the inductor L1, electrically coupled to the second receiving terminal VR_2, receives the low potential VS_L. At this time, the positive terminal 54 of the unilateral connecting component D3 is at the low potential VS_L and the unilateral connecting component D3 is closed, thereby the inductor L1 is charged with the inputted energy. The potential outputted from the first output terminal Vout_1 is provided by the first channel terminal 46 of the capacitor C3. When the switch SW1 is turned off, the second terminal 44 of the inductor L1 produces the high potential VS_H according to inductance of the inductor L1, and the positive terminal 54 of the unilateral connecting component D3 is at a high potential; therefore, the unilateral connecting component D3 is conducted. At this time, the capacitor C3 is charged, and the potential outputted from the first output terminal Vout_1 is actually provided by the second terminal 44 of the inductor L1.

Referring to FIG. 4(B) and FIG. 3, when the switch SW2 is conducted, the first terminal 62 of the inductor L2, electrically coupled to the first receiving terminal VR_1, is pulled up to the high potential VS_H. The second terminal 64 of the inductor L2, electrically coupled to the second receiving terminal VR_2, receives the low potential VS_L. At this time, the negative terminal 66 of the unilateral connecting component D4 is at a high potential and the unilateral connecting component D4 is closed, thereby the inductor L2 is charged with the inputted energy. The potential outputted from the second output terminal Vout_2 is provided by the first terminal 70 of the capacitor C4. When the switch SW2 is turned off, the second terminal 64 of the inductor L2 has a high potential VS_H according to inductance of the inductor L2, and the negative terminal 66 of the unilateral connecting component D4 is at a low potential; therefore, the unilateral connecting component D4 is conducted and the capacitor C4 is charged. At this time, the potential outputted from the second output terminal Vout_2 is actually provided by the first terminal 62 of the inductor L2.

Summarily, the power conversion circuit in each embodiment of the present invention solves the above-mentioned conventional problems by making the potentials outputted from the two output terminals of the voltage converter to be at both sides of the ground potential. Therefore, the internal components of the power conversion circuit would not be in a high-voltage state; the components with the same quality applied in the power conversion circuit of the embodiments can withstand a larger cross-voltage than those applied in conventional power conversion circuits. The light emitting diode strings can accommodate a larger amount of light emitting diodes. Accordingly, the power conversion circuit of the present invention can reduce manufacturing cost, and resolve the problems of inequality brightness and complex control of the light emitting diode string.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power conversion circuit for light emitting diode, adapted to drive a light emitting diode string, the power conversion circuit comprising:

a voltage converter, having two receiving terminals and two output terminals, the two receiving terminals being electrically coupled to a direct current power supply to convert the direct current power supply to direct current output signals which are outputted from the output terminals of the voltage converter to drive the light emitting diode string, wherein one of the output terminals has a positive potential and another one of the output terminals has a negative potential;

wherein the voltage converter comprises:
a first receiving terminal electrically coupled to a high potential of the direct current power supply;
a second receiving terminal electrically coupled to a low potential of the direct current power supply;
a first output terminal configured for providing an output of positive potential;
a second output terminal configured for providing an output of negative potential;
a switch having a first terminal and a second terminal, the first terminal of the switch being electrically coupled to the first receiving terminal;
a first inductor having a positive terminal and a negative terminal, the positive terminal of the first inductor being electrically coupled to the second terminal of the switch, the negative terminal of the first inductor being electrically coupled to the second receiving terminal;
a second inductor having a positive terminal and a negative terminal, the second inductor being electromagnetically coupled to the first inductor, and the negative terminal of the second inductor being maintained at a preset low potential;
a third inductor having a positive terminal and a negative terminal, the third inductor being electromagnetically coupled to the first inductor, and the negative terminal of the third inductor being electrically coupled to the second output terminal;
a first unilateral connecting component electrically coupled to the positive terminal of the second inductor and the first output terminal, and only allowing electrical current to flow from the positive terminal of the second inductor to the first output terminal;
a second unilateral connecting component electrically coupled to the positive terminal of the third inductor and the negative terminal of the second inductor, and only allowing electrical current to flow from the positive terminal of the third inductor to the negative terminal of the second inductor;
a first capacitor, one end of the first capacitor being electrically coupled to the first output terminal, and another end of the first capacitor being electrically coupled to the negative terminal of the second inductor; and
a second capacitor, one end of the second capacitor being electrically coupled to the negative terminal of the second inductor, and another end of the second capacitor being electrically coupled to the second output terminal.

2. The power conversion circuit for light emitting diode of claim 1, wherein the preset low potential is the ground potential.

3. A power conversion circuit for light emitting diode, adapted to drive a light emitting diode string, the power conversion circuit comprising:
a voltage converter, having two receiving terminals and two output terminals, the two receiving terminals being electrically coupled to a direct current power supply to convert the direct current power supply to direct current output signals which are outputted from the output terminals of the voltage converter to drive the light emitting diode string, wherein one of the output terminals has a positive potential and another one of the output terminals has a negative potential;
wherein the voltage converter comprises:
a first receiving terminal electrically coupled to a high potential of the direct current power supply;
a second receiving terminal electrically coupled to a low potential of the direct current power supply;
a first output terminal configured for providing an output of positive potential;
a second output terminal configured for providing an output of negative potential;
a potential booster electrically coupled to the first receiving terminal and the second receiving terminal to receive the direct current power supply, and having an output terminal served as the first output terminal; and
an inverse potential booster electrically coupled to the first receiving terminal and the second receiving terminal to receive the direct current power supply, and having an output terminal served as the second output terminal.

4. The power conversion circuit for light emitting diode of claim 3, wherein the potential booster comprises:
an inductor having a first terminal and a second terminal, the first terminal of the inductor being electrically coupled to the first receiving terminal;
a switch electrically coupled to the second terminal of the inductor and the second receiving terminal;
a unilateral connecting component electrically coupled to the second terminal of the inductor and the first output terminal, and only allowing electrical current to flow from the second terminal of the inductor to the first output terminal; and
a capacitor electrically coupled to the first output terminal and the second receiving terminal.

5. The power conversion circuit for light emitting diode of claim 3, wherein the inverse potential booster comprises:
a switch having a first terminal and a second terminal, the first terminal electrically coupled to the first receiving terminal;
an inductor electrically coupled to the second terminal of the switch and the second receiving terminal;
a unilateral connecting component electrically coupled to the second terminal of the switch and the second output terminal, and only allowing electrical current to flow from the second output terminal to the inductor; and
a capacitor electrically coupled to the second output terminal and the second receiving terminal.

* * * * *